United States Patent
Li et al.

(10) Patent No.: US 8,854,984 B1
(45) Date of Patent: Oct. 7, 2014

(54) NETWORK FABRIC STRESS TEST

(75) Inventors: Jiangbo Li, San Jose, CA (US); Victor Lin, Fremont, CA (US)

(73) Assignee: Google Inc., Mountain View, CA (US)

( * ) Notice: Subject to any disclaimer, the term of this patent is extended or adjusted under 35 U.S.C. 154(b) by 194 days.

(21) Appl. No.: 13/404,807

(22) Filed: Feb. 24, 2012

(51) Int. Cl.
*H04L 12/26* (2006.01)

(52) U.S. Cl.
USPC .......................................................... 370/242

(58) Field of Classification Search
USPC .......................................................... 370/248
See application file for complete search history.

(56) References Cited

U.S. PATENT DOCUMENTS 7,489,641 B2 * 2/2009 Miller et al. ................ 370/241.1
2010/0097943 A1 * 4/2010 D'Souza et al. ............. 370/248

* cited by examiner

*Primary Examiner* — Huy D Vu
*Assistant Examiner* — Teisha D Hall
(74) *Attorney, Agent, or Firm* — Foley & Lardner LLP; Edward A. Gordon

(57) ABSTRACT

A method of testing network device connectivity in a network by a host computing device includes identifying a topology of the network, where the network includes a plurality of communication paths connecting a plurality of network devices. The method further includes developing a test procedure based on the topology and a plurality of constraints, where a first constraint in the plurality of constraints includes sending a test data stream through each communication path in the plurality of communications paths only once in each direction. The method further includes configuring the plurality of network devices to perform the test procedure, initiating the test procedure, where initiating includes sending the test data stream from the host computing device to a first network device in the plurality of network devices, and monitoring the progress of the test procedure.

29 Claims, 6 Drawing Sheets

NETWORK FABRIC STRESS TEST

FIELD OF THE DISCLOSURE

The present disclosure relates generally to cluster networks and specifically relates to testing network device connections within a cluster network.

BACKGROUND

A cluster network typically includes a number of host computing devices connected via a number of network devices such as switches or routers. Each network device usually has one or more direct communication paths, like wire or cable connections, with other network devices or host computing devices within the cluster network. The network devices control the transmission of data and other messages within the cluster network.

It is important that all the communication paths between the network devices are functional in both directions to maintain the integrity of the cluster network. The communication paths between network devices can be tested by sending line rate data traffic to saturate the communication paths and measure the loss of traffic due to the saturation. One method of implementing such a stress test in a cluster network is to have the host computing devices generate test packets and send the packets to other hosts within the cluster. This method, however, only tests the few network devices and communication paths that are used to send the data packets between the two host computing devices.

Multicasting or broadcasting can also be used to test communication paths within a cluster network. Multicasting is a method of delivering information from a host computing device to a group of destination computing devices, instead of just one computing device. Broadcasting is a method of delivering information from a host computing device to all the other computing devices in a cluster. Both methods allow more network devices and communication paths to be tested, but none can test all the network devices and communication paths in the cluster. For example, multicasting and broadcasting cannot test bi-directional functionality of network communication paths since the test packet traffic only flows outward from the host computing device.

SUMMARY

Aspects of the systems and methods described herein allow for bi-directional line rate traffic testing of all communication paths and network devices in a cluster network at the same time.

In one aspect, a method of testing network device connectivity in a network is disclosed. The method includes identifying a topology of the network, where the network includes a plurality of communication paths connecting a plurality of network devices. The method further includes developing a test procedure based on the topology and a plurality of constraints, where a first constraint in the plurality of constraints includes sending a test data stream through each communication path in the plurality of communications paths only once in each direction. The method further includes configuring the plurality of network devices to perform the test procedure, and performing the test procedure.

In another aspect, a method of testing network device connectivity in a network by a host computing device is disclosed. The method includes identifying a topology of the network, where the network includes a plurality of communication paths connecting a plurality of network devices. The method further includes developing a test procedure based on the topology and a plurality of constraints, where a first constraint in the plurality of constraints includes sending a test data stream through each communication path in the plurality of communications paths only once in each direction. The method further includes configuring the plurality of network devices to perform the test procedure, initiating the test procedure, where initiating includes sending the test data stream from the host computing device to a first network device in the plurality of network devices, and monitoring the progress of the test procedure.

In another aspect, a computing network system is disclosed. The system includes a plurality of network devices, a plurality of communication paths connecting the plurality of network devices, and a host computing device. The host computing device is configured to identify a topology of the plurality of communication paths and the plurality of network devices, develop a test procedure based on the topology and a plurality of constraints, where a first constraint in the plurality of constraints includes sending a test data stream through each communication path in the plurality of communication paths only once in each direction, and configure the plurality of network devices to perform the test procedure.

In another aspect, a non-transitory computer readable medium storing computer executable instructions, which, when executed by a processor, cause the processor to carry out a method for testing network device connectivity in a network by a host computing device, is disclosed. The non-transitory computer readable medium includes instructions to identify a topology of the network, where the network includes a plurality of communication paths connecting a plurality of network devices. The non-transitory computer readable medium further includes instructions to develop a test procedure based on the topology and a plurality of constraints, where a first constraint in the plurality of constraints includes sending a test data stream through each communication path in the plurality of communications paths only once in each direction. The non-transitory computer readable medium further includes instructions to configure the plurality of network devices to perform the test procedure, instructions to initiate the test procedure, where initiating includes sending the test data stream from the host computing device to a first network device in the plurality of network devices, and instructions to monitor the progress of the test procedure.

BRIEF DESCRIPTION OF THE DRAWINGS

The systems and methods may be better understood from the following illustrative description with reference to the following drawings in which.

DETAILED DESCRIPTION

To provide an overall understanding of the systems and methods described herein, certain illustrative implementations will now be described, including systems and methods for bi-directional line rate traffic testing of all network devices and communications paths in a cluster network at the same time. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
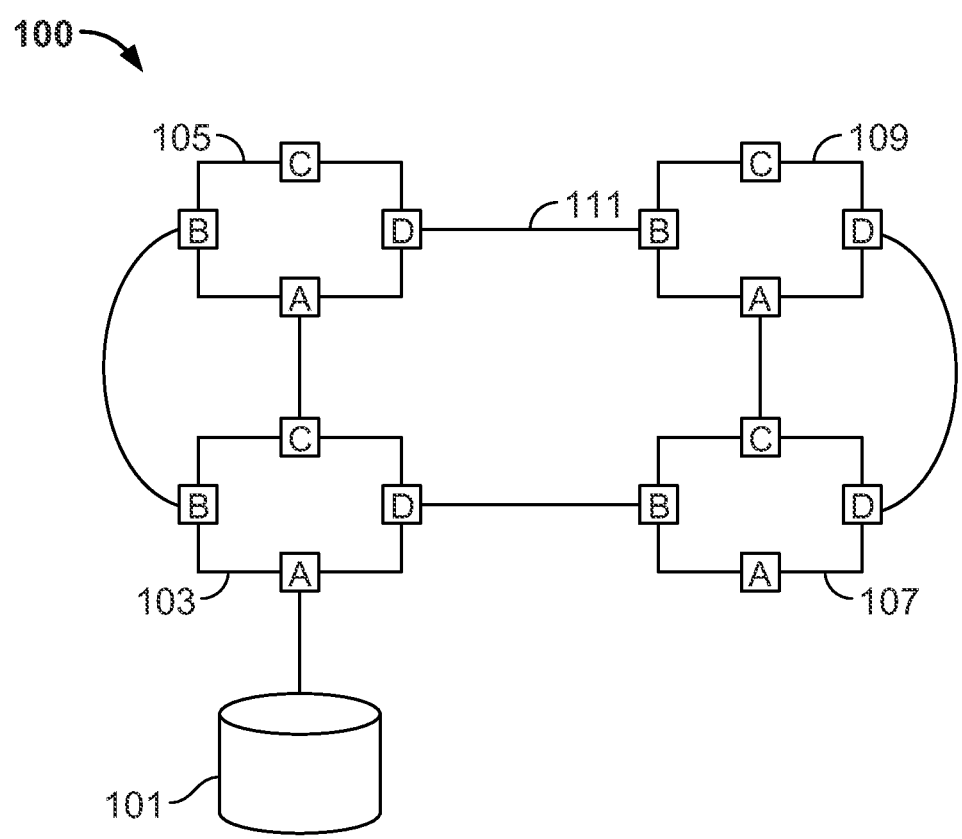
FIG. 1 shows a general cluster network in accordance with an implementation as described herein.

In order to describe systems and methods for bi-directional line rate traffic testing of all network devices and communications paths in a cluster network at the same time, a general cluster system is first described. FIG. 1 shows a simplified representation of a type of cluster network 100 with which the systems and methods may be used. Cluster network 100 includes a host computing device 101 and four network devices 103, 105, 107, and 109. However, cluster networks in general usually have a larger number of host computing devices and network devices. For example, cluster network 100 may be a subset of a larger cluster network. The network devices may be switches, routers, or other devices that provide connectivity between hosts in a cluster network. Each network device illustrated in FIG. 1 has four ports labeled A, B, C, and D. Generally, network devices are not limited to four ports but can have any number of ports in a variety of configurations. Communication paths, such as cable 111, connect ports of different network devices and host computing devices to other network devices or host computing devices. Cable 111, for example, connects port 105-D with port 109-B. Other communication paths are illustrated connecting various ports of the networking devices together, as well as a communication path between host computing device 101 and port 103-A. The layout of port connections is not limited to that shown in FIG. 1, but may encompass various different configurations.

Each port illustrated in FIG. 1 has an associated peer port. Peer ports are ports that are directly connected through a communication path. For example, in FIG. 1 ports 103-C and 105-A are peer ports of each other, as are ports 103-B and 105-B, and so on. When a port receives data packets from a peer port, it can be termed an input port. When a port sends data packets to a peer port, it can be termed an output port. Each port on a network device is also associated with a send counter and a receive counter. These counters can track the amount of data, in bytes for example, that are sent or received by that port.

Cluster network 100 allows host computing device 101 to communicate with other host computing devices in the cluster. For example, host computing device 101 sends data packets that are addressed to another host computing device (not shown in FIG. 1) connected to port 109-C. The data packets first go to port 103-A on network device 103, which provides packet forwarding services to host computing device 101. For the data packets to reach port 109, the data packets are first forwarded to either port 105 or 107, which then forward the packet to port 109. Since port 103 is directly connected to ports 105 and 107 by multiple communication paths, the data packets can be forwarded to port 109 through several different pathways. For example, in one pathway port 103-D can forward the data packets to its peer port 107-B, and then port 107-C can forward the data packets to its peer port 109-A. Network device 109 then forwards the data packets to the addressed host computing device connected to port 109-C.

Before a cluster network is deployed for general use, the network connections within the cluster should all be tested to determine if all the connections are functional. Ideally, all the communication paths between network devices and host computing devices should be tested in each direction. Testing is usually accomplished by forwarding test packets from a host computing device to other host computing devices. However, this method does not test all the network devices in the cluster and does not test communication paths bi-directionally. For example, in the data packet forwarding described previously, the data packets will not be forwarded through all the network devices and the data packets are only forwarded in one direction. Even techniques such as multicasting and broadcasting, which allow packet forwarding from one host computing device to multiple destination host computing devices, may not reach all network devices and do not send packets bi-directionally.

Figure 2:
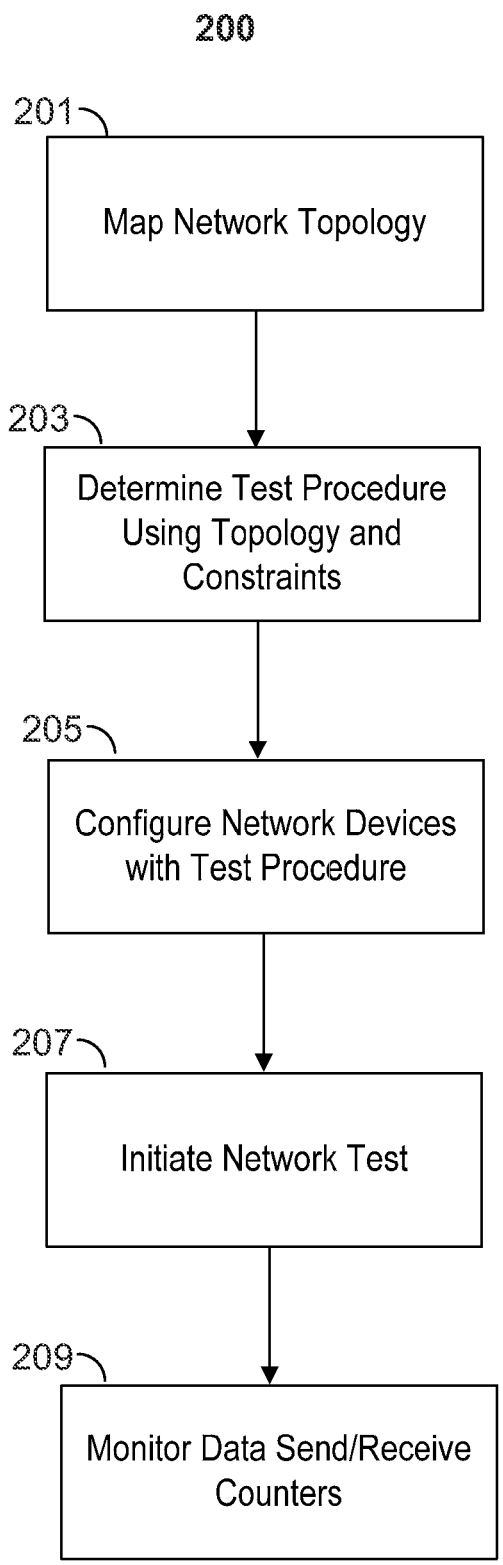
FIG. 2 shows a method of testing network devices and communications paths in a cluster network in accordance with an implementation as described herein.

Systems and methods are herein disclosed to perform comprehensive testing of network connectivity in a cluster network. FIG. 2 shows a method 200 for testing network connectivity in a cluster network that is able to test all network devices and communication paths bi-directionally at the same time using line rate traffic. The method includes mapping the topology of the cluster network and then configuring each network device within the cluster network to a specified data packet stream forwarding test procedure. A test procedure is developed using the network topology and one or more constraints. The test procedure specifies a specific forwarding sequence for the test data stream in the cluster network. One constraint of the test procedure is that the test data stream should be sent through each communication path in the cluster network once in each direction.

The host computing device then configures each network device in the cluster network to perform the test procedure. The host computing device then initiates the network connectivity test by sending a test data stream to the cluster network. The network devices in the cluster network will perform the test procedure by forwarding the test data stream according in the manner and order specified by the test procedure. The host computing device can monitor the progress of the test procedure. Each port on the network devices in the cluster network has counters for bytes sent and received. These counters are monitored to determine if each port has sent and received the entire test data stream at least once. At the end of the test, if a counter for a port is lower than expected (e.g. it did not send or receive all of the test data stream), the connection is flagged as a faulty link. The test can be performed on a whole cluster network or can be performed on pre-defined subsets of the cluster network. Several subsets can be defined on a cluster network, where tests can be performed on each subset of the cluster. A network device may belong to more than one subset of cluster networks and can differentiate between tests occurring within different subsets. This is done by assigning certain ports to certain subsets in the network device.

Each network device has dedicated hardware for performing data plane services like data traffic forwarding. The dedicated hardware may be an application specific integrated circuit (ASIC), field programmable gate array (FPGA), or some other hardware circuit. Method 200 for testing network connectivity in a cluster network can be implemented in a number of ways. One way to implement method 200 is to configure a Layer 2 virtual local area network (VLAN) on each network device. A Layer 2 VLAN is used to create a multicast domain so that packets from one port will be forwarded to all the other ports in the same VLAN. The testing procedure can also be implemented using Internet Protocol version 4 or 6 (IPv4 and IPv6) multicast. By setting up different IP multicast groups, the test procedure running on the host computing device can control how each network device forwards incoming data packets to multiple output ports. A number of other protocols and networking tools may also be used to configure the network devices. The data plane hardware in a network device can also be configured to drop packets during the test of the cluster network. For example, the access control list (ACL) of an ASIC optionally can be programmed to drop any test data streams received by the network device if the test data stream has already been forwarded through all of a network device's ports.

Method 200 begins by mapping out the topology of the cluster network to be tested, shown as step 201 in FIG. 2. The topology of a cluster network includes the host computing devices, network devices, and any other devices within the network and the communications paths connecting the ports of the various devices together. For example, FIG. 1 illustrates the topology of a cluster network. A host computing device that is part of the cluster network, such as host computing device 101 in FIG. 1, can be used to determine the network topology.

After the network topology of the cluster network is determined, a host computing device uses the network topology and one or more constraints to construct a test procedure, as illustrated in step 203 in FIG. 2. The test procedure is a predetermined routing or forwarding sequence for the test data stream over the cluster network. Constraints can be provided by, for example, a system administrator that is overseeing the test of the cluster network. One constraint of the test procedure is that it should be constructed so that the test data stream is sent over each communication path within the cluster network in each direction only once. There may be more than one test procedure possible for a given network topology and set of constraints. The IPv4/IPv6 multicast, Layer 2 VLAN multicast, and ACL, all of which are generally supported by most commoditized network device ASICs, can be used to implement the packet forwarding constraints. One such implementation of a test procedure is discussed in relation to FIGS. 3A through 3E.

After the test procedure has been determined by the host computing device, each network device in the cluster network is configured to perform the test procedure, illustrated as step 205 in FIG. 2. The network devices can be configured by a host computing device, such as host computing device 101 in FIG. 1. As part of the configuration, the send counter and receive counter of each port in the network devices are reset. This allows the host computing device to monitor whether each port has sent and received the entire test data stream. If the amount of data sent or received by a port is smaller than the test data stream, it is an indication that a problem may exist.

Once the network devices are configured with the test procedure, the test of the cluster network is initiated, illustrated as step 207 in FIG. 2. The test is initiated by a host computing device within the cluster network sending out the test data stream to a network device in the cluster network. The network device then forwards the test data stream to the rest of the cluster network according to the test procedure. The test data stream will propagate through the cluster network according to the test procedure so that the test data stream is sent through each communication path once in each direction.

A host computing device within the cluster network monitors the send counters and receive counters for each network device port, illustrated as step 209. The counters can be used to determine if there are any connection problems within the cluster network. For example, assume the test data stream is 10 megabytes (MB) in size. The network devices will attempt to send the test data stream over the communication paths as specified by the test procedure. The send counter and receive counters for all the ports of the network devices should both be 10 MB when the test has finished. If the send counter or receive counter for a port is different, for example if the send counter is 10 MB but the receive counter is 0 MB, then it indicates that the port did not receive any data from its peer port and there may be a faulty connection in the cluster network. Any such faults can be flagged by the network device and tracked by the host computing device. A system administrator can be notified of the fault flags so that the connections may be investigated and fixed. If the cluster network is tested again before it can be fixed, the test procedure can be revised to avoid all connections within the cluster network that have fault flags. The network devices would then be configured to perform the revised test procedure before the test is initiated.

An example of a specific test procedure that can be used to test a cluster network is illustrated in FIGS. 3A through 3E. The test procedure, or the exact path of the test data stream through the cluster network, is determined based on the network topology and one or more constraints. The test procedure illustrated in FIGS. 3A through 3E has the following constraints: when a network device receives the test data stream on one of its ports (the input port), the network device forwards the test data stream to all of its output ports unless the output port has previously forwarded the test data stream or has been flagged as a faulty link. If all the output ports have previously forwarded the test data stream, the network device drops the test data stream and any subsequent test data streams that it receives. By applying these constraints to the network topology of cluster network 300 in FIGS. 3A through 3E, the path of the test data stream can be determined by host computing device 301. Host computing device then configures each network device to forward the test data stream according to the path that was determined by host computing device 300.

A cluster network 300 is shown in FIGS. 3A through 3E. Cluster network 300 includes a host computing device 301 and network devices 303, 305, 307, and 309. Cluster network 300 may be a subset of a larger cluster network. Cluster networks generally have larger numbers of host computing devices and network devices, but to simplify the description only four network devices are illustrated in FIGS. 3A through 3E. The systems and methods disclosed herein can be applied to a cluster network with any number of host computing devices and network devices. The description of FIGS. 3A through 3E assumes that all communication paths and ports are functional. Fault detection is handled using the fault flags described above.

Before testing begins, a host computing device such as host computing device 301 maps out the network topology of cluster network 300. This includes identifying all the host computing devices, network devices, and communication paths within the cluster network and how the ports are connected. Next, host computing device 301 determines the test procedure based on the network topology and the constraints described previously. The host computing device 301 configures each network device to perform the test procedure. All the send counter and receive counters for the network devices ports are also reset.

Figure 3A:
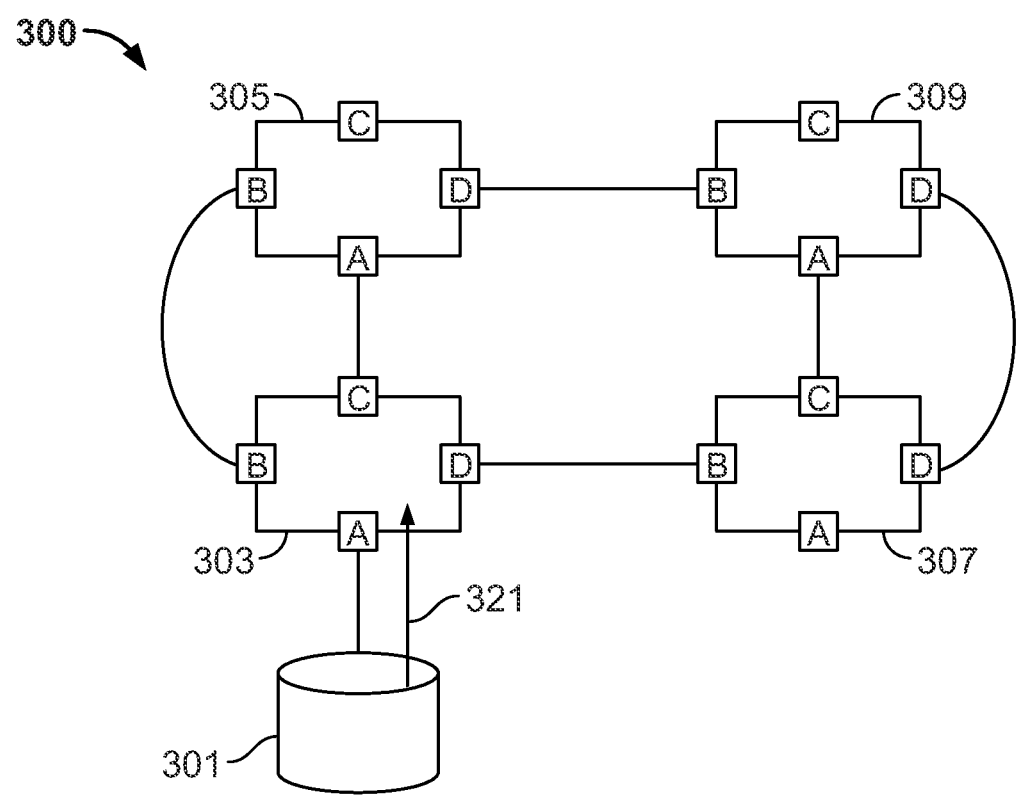
FIGS. 3A through 3E show a system and method for testing network connections and communications paths in a cluster network in accordance with an implementation as described herein.
Figure 3B:
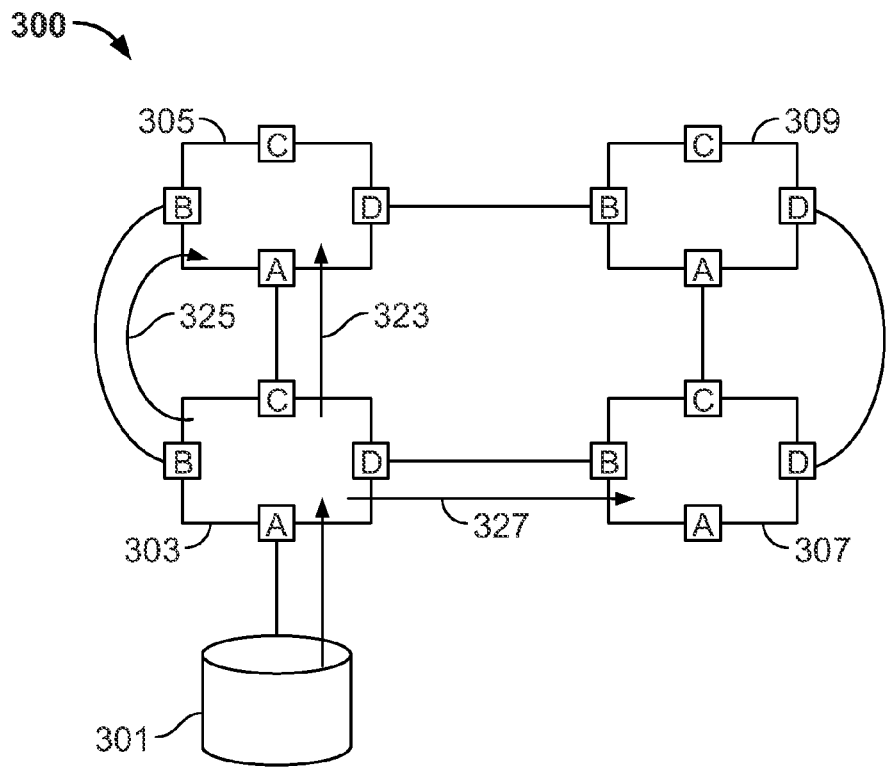

Once the network devices have been configured, host computing device 301 initiates the test by sending network device 303 a test data stream, illustrated as test path 321 in FIG. 3A. Network device 303 receives the test packets on port 303-A, the input port. The receive counter of port 303-A is incremented to indicate the size of the test data stream that was received. The output ports for network device 303 are ports 303-B, 303-C, and 303-D. Since the send counter for each output port should be zero (it has not sent any data yet), network device 303 forwards the test data stream through all of its output ports, shown in FIG. 3B. Specifically, network device 303 forwards the test data stream to peer port 305-A through test path 323, to peer port 305-B through test path 325, and to peer port 307-B through test path 327. The send counters for output ports 303-B, 303-C, and 303-D are incremented to indicate the size of the test data stream that was forwarded.

Network device 305 should receive the test data stream at ports 305-A and 305-B and network device 307 should receive the test data stream at port 307-B (collectively, the input ports). The receive counters of the input ports are incremented to indicate the size of the test data stream that was received. The output ports for network device 305 are ports 305-A, 305-B and 305-D. The output ports for network device 307 are 307-C and 307-D. Since the send counter for each output port should be zero (it has not sent any data yet), network devices 305 and 307 forward the test data stream through all of its output ports, shown in FIG. 3C. Specifically, network device 305 will forward the test data stream to peer port 303-C through test path 329, to peer port 303-B through test path 331, and to peer port 309-B through test path 333. Network device 307 will forward the test data stream to peer port 309-A through test path 335 and to peer port 309-D through test path 337. The send counters for output ports 305-A, 305-B, 305-D, 307-C, and 307-D are incremented to indicate the size of the test data stream that was forwarded.

Figure 3C:
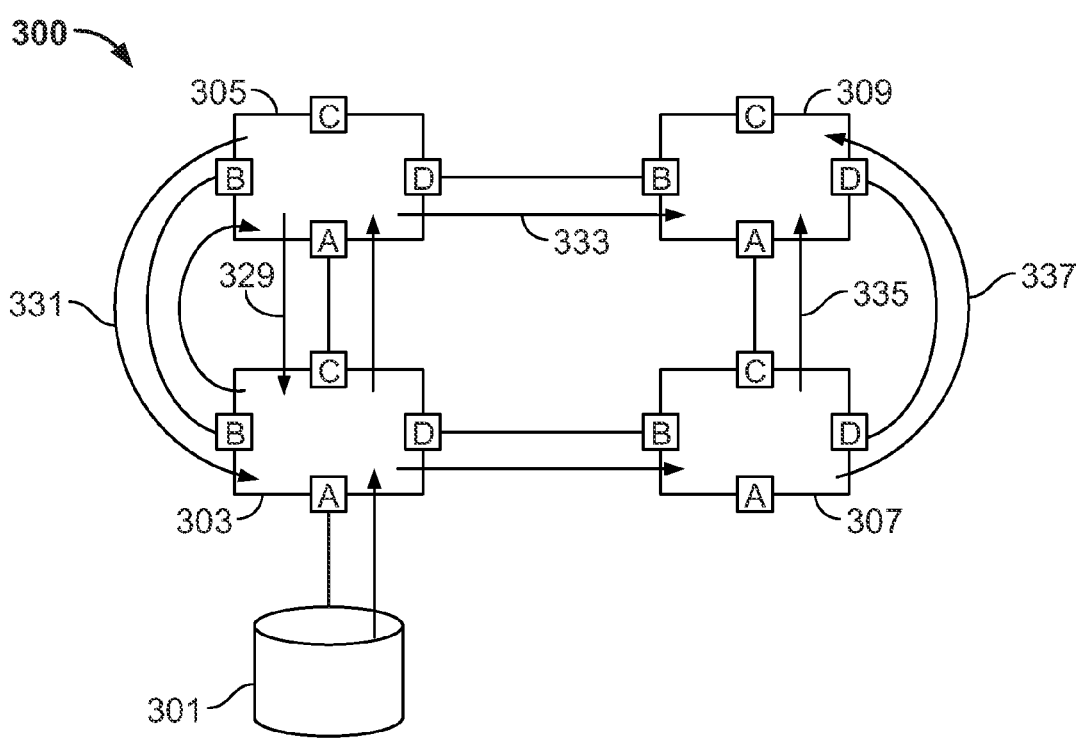
Figure 3D:
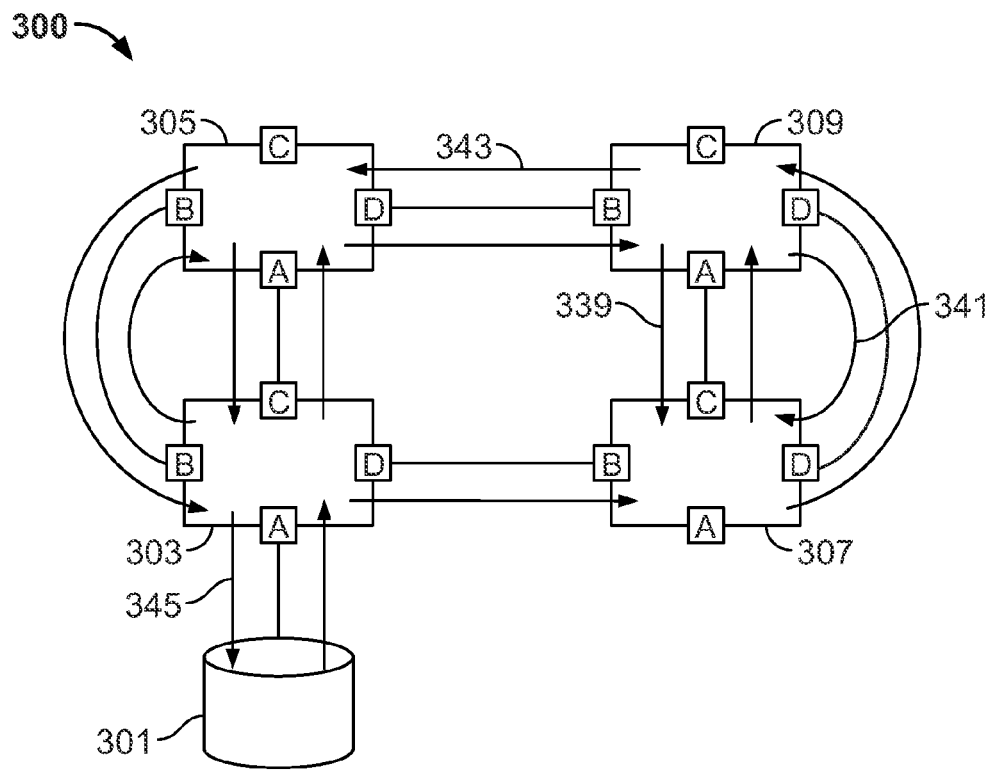

Once the forwarding illustrated in FIG. 3C has completed, network devices 303 and 309 should have received test packets on ports 303-B, 303-C, 309-A, 309-B, and 309-D (the input ports). The receive counters of the input ports are incremented to indicate the size of the test data stream that was received. The output ports for network device 303 are 303-A, 303-B, 303-C, and 303-D. The output ports for network device 309 are 309-A, 309-B, and 309-D. On network device 303, the output ports 303-B, 303-C, and 303-D have previously sent out test packets to their respective peer ports. The only output port on network device 303 that has not sent the test data stream to its peer port is 303-A. Thus network device 303 forwards the test data stream to host computing device 301 over test path 345 as shown in FIG. 3D. For network device 309, none of the output ports have previously forwarded the test data stream. Thus network device 309 sends test data stream to peer port 307-C over test path 339, to peer port 307-D over test path 341, and to peer port 305-D over test path 343. The send counters for output ports 303-A, 309-A, 309-B, and 309-D are incremented to indicate the size of the test data stream that was forwarded.

Figure 3E:
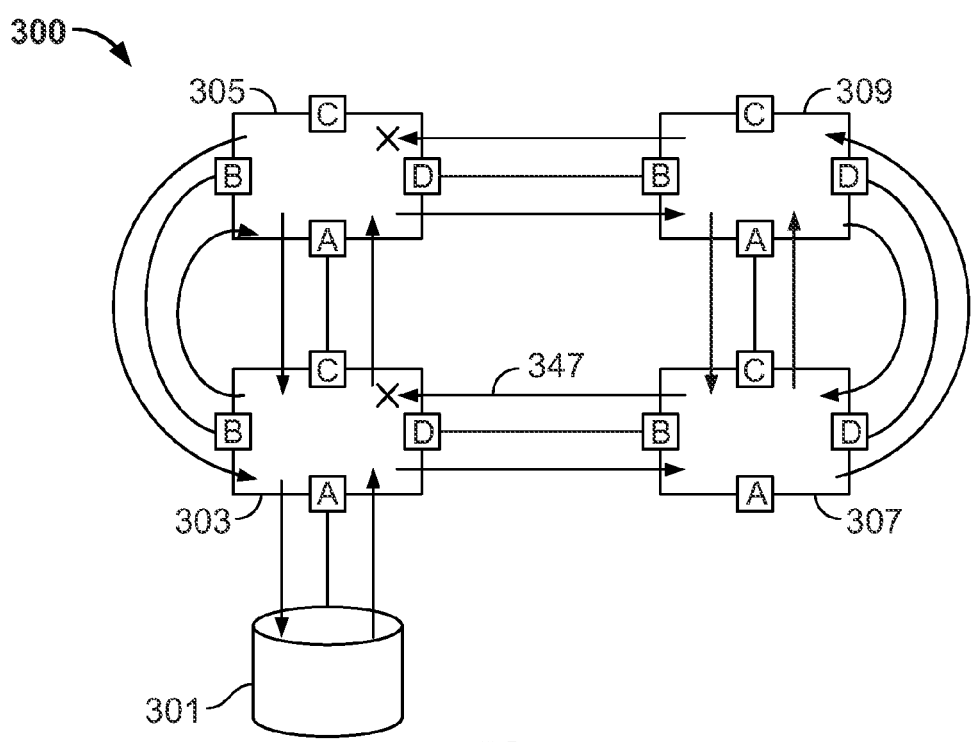

Once the forwarding illustrated in FIG. 3D has completed, network devices 305 and 307 should have received test packets on ports 305-D, 307-C, and 307-D (the input ports). The receive counters of the input ports are incremented to indicate the size of the test data stream that was received. The output ports for network device 305 are 305-A and 305-B. The output ports for network device 307 are 307-B, 307-C and 307-D. For network device 305, all of its output ports have previously forwarded the test data stream to their respective peer ports. Thus network device 305 drops the test data stream (noted by an X on network device 305 in FIG. 3E). For network device 307, only output port 307-B has not forwarded the test data stream to its peer port. Thus network device 307 forwards the test data stream to peer port 303-D over test path 347, as illustrated in FIG. 3E. The send counter for output port 307-B is incremented to indicate the size of the test data stream that was forwarded.

Network device 303 should receive the test data stream on input port 303-D. The receive counter of the input port is incremented to indicate the size of the test data stream that was received. The output ports of network device 303 are 303-A, 303-B, and 303-C. Since all the output ports have previously forwarded the test data stream, network device 303 drops the test data stream (noted by an X on network device 303 in FIG. 3E). At this point, all the send counters and receive counters of the ports in cluster 300 have been set to indicate that they have all forwarded the test data stream to their respective peer ports. Since all the communication paths have been tested in both directions, the test is complete. Host computing device 301 monitors the send counters and receive counters of the ports in cluster 300 to determine when the test is complete. Host computing device 301 can also set any fault flags if the send counter or receive counter of any port indicates that it did not send or receive the entire test data stream. In this manner, bi-directional line rate traffic testing of all network devices and communications paths in a cluster network at the same time can be accomplished.

Figure 4:
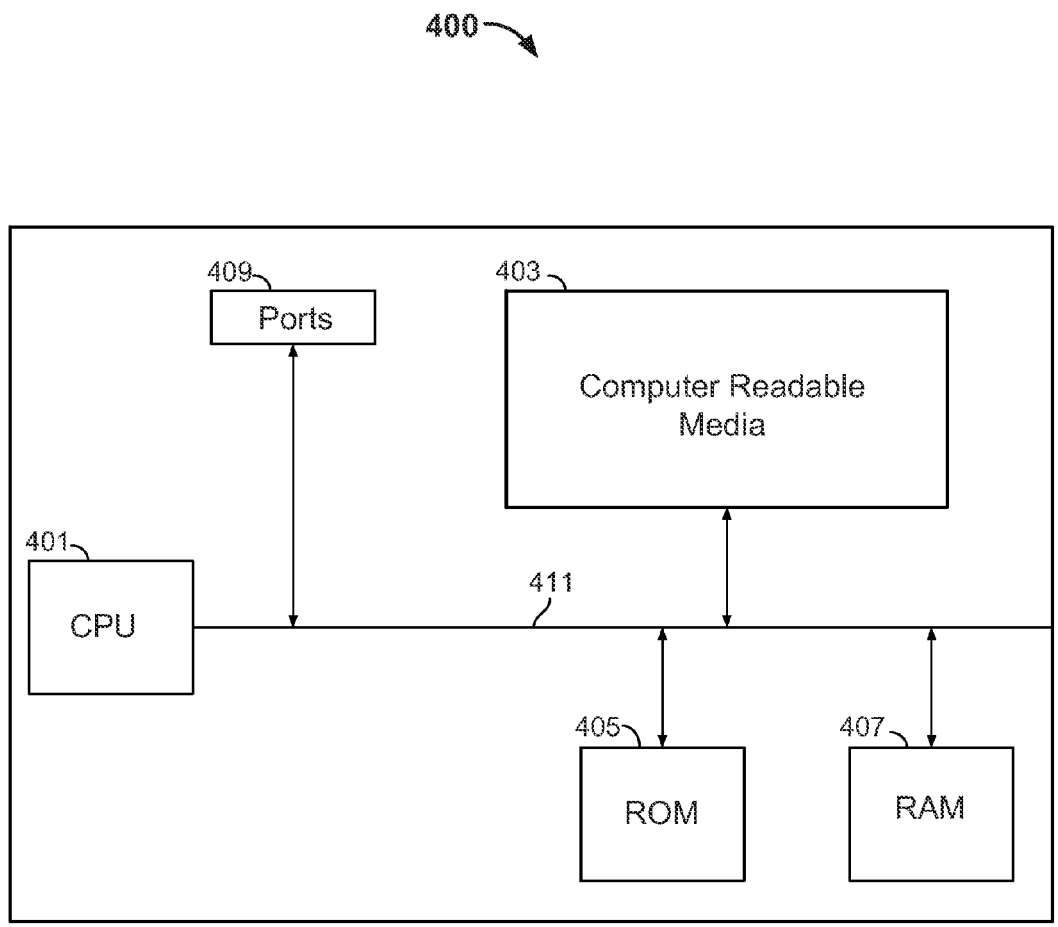
FIG. 4 shows a host computing device in accordance with an implementation as described herein.

The general structure and components of a host computing device will briefly be discussed. FIG. 4 shows an example host computing device 400 for use in cluster networks. Host computing device 400 may be a desktop computer, laptop computer, server, or any general purpose computing device. Host computing device 400 includes a central processing unit (CPU) 401, computer readable media 403, read-only memory (ROM) 405, random access memory (RAM) 407, ports 409, and bus 411. The bus 411 allows communication of information between the various components of host computing device 400. Ports 409 allow communication of information between host computing device 400 and other devices such as network devices. Computer readable media 405 can store instructions to perform method 200 in FIG. 2, including instructions to identify network topologies, develop test procedures based on the network topology and one or more constraints, configure network devices according to the test procedure, and monitor a network connectivity test. Host computing device 400 may have additional components not shown in FIG. 4.

Various aspects of the testing network connectivity described herein can be implemented as computer executable instructions stored on non-transitory computer readable media on a host computing device such as host computing device 400 in FIG. 4. When executed, the computer executable instructions cause a host computing device to perform a method for network connectivity testing described herein, such as method 200 in FIG. 2. Examples of suitable non-transitory computer readable media include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

It will be apparent to one of ordinary skill in the art that aspects of the systems and methods described herein may be implemented in many different forms of software, firmware, and hardware in the implementations illustrated in the figures. The actual software code or specialized control hardware used to implement aspects consistent with the principles of the systems and method described herein is not limiting. Thus, the operation and behavior of the aspects of the systems and methods were described without reference to specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method of testing network device connectivity in a network, the method comprising:
    identifying a topology of the network, wherein the network comprises a plurality of communication paths connecting a plurality of network devices;
    developing a test procedure based on the topology and a plurality of constraints, wherein
        a first constraint in the plurality of constraints comprises sending a test data stream through each communication path in the plurality of communications paths only once in each direction;
    configuring the plurality of network devices to perform the test procedure; and
    performing the test procedure by attempting to send the test data stream from a first network device in the plurality of network devices to a second network device in the plurality of network devices through a first communication path in the plurality of communication paths, wherein the first network device comprises a first port connected to the first communication path and associated with a send counter, and wherein the second network device comprises a second port connected to the first communication path and associated with a receive counter.

2. The method of claim 1, the method further comprising:
    determining whether the attempt to send the test data stream from the first network device to the second network device is successful; and
    when the attempt to send the test data stream from the first network device to the second network device is determined to be successful, setting the send counter and receive counter to equal the size of the test data stream.

3. The method of claim 1, the method further comprising:
    determining whether the attempt to send the test data stream from the first network device to the second network device is successful; and
    when the attempt to send the test data stream from the first network device to the second network device is determined to be unsuccessful, setting a fault flag.

4. The method of claim 1, wherein configuring the plurality of network devices comprises setting the send counter and the receive counter to zero.

5. The method of claim 1, wherein the configuring the plurality of network devices comprises configuring a hardware circuit of a first network device.

6. The method of claim 5, wherein the hardware circuit is an ASIC.

7. The method of claim 1, wherein the method is implemented using a Layer 2 virtual local area network.

8. The method of claim 1, wherein a second constraint in the plurality of constraints comprises dropping the test data stream by a first network device in the plurality of network devices when the first network device has previously sent the test data stream over each communication path connected to the first network device.

9. The method of claim 1, further comprising initiating the test procedure, sending the test data stream from a host computing device to the first network device in the plurality of network devices, and
    monitoring the progress of the test procedure.

10. A method of testing network device connectivity in a network by a host computing device, the method comprising:
    identifying a topology of the network, wherein the network comprises a plurality of communication paths connecting a plurality of network devices;
    developing a test procedure based on the topology and a plurality of constraints, wherein a first constraint in the plurality of constraints comprises sending a test data stream through each communication path in the plurality of communications paths only once in each direction;
    configuring the plurality of network devices to perform the test procedure;
    initiating the test procedure, wherein initiating comprises sending the test data stream from the host computing device to a first network device in the plurality of network devices, wherein the first network device comprises a plurality of ports, and a first port in the plurality of ports is associated with a first send counter and a first receive counter; and
    monitoring the progress of the test procedure.

11. The method of claim 10, wherein the monitoring the progress of the test procedure comprises monitoring the value of the first send counter and first receive counter.

12. The method of claim 10, wherein configuring the plurality of network devices comprises setting the first send counter and the first receive counter to zero.

13. The method of claim 10, the method further comprising:
    attempting to send the test data stream from the first port to a second port on a second network device in the plurality of network devices;
    determining whether the attempt to send the test data stream from the first network device to the second device is successful, wherein the determining comprises checking the first send counter of the first port and a second receive counter associated with the second port; and
    when the attempt to send the test data stream from the first port to the second port is determined to be unsuccessful, setting a fault flag.

14. The method of claim 13, the method further comprising:
    developing a revised test procedure, wherein a second constraint in the plurality of constraints comprises excluding the use of the first port to send the test data stream.

15. The method of claim 9, wherein the configuring the plurality of network devices comprises configuring a hardware circuit of a first network device.

16. The method of claim 15, wherein the hardware circuit is an ASIC.

17. The method of claim 10, wherein a second constraint in the plurality of constraints comprises dropping the test data stream by a first network device in the plurality of network devices when the first network device has previously sent the test data stream over each communication path connected to the first network device.

18. A computing network system, the system comprising:
    a plurality of network devices;
    a plurality of communication paths connecting the plurality of network devices; and
    a host computing device, wherein the host computing device is configured to:
        identify a topology of the plurality of communication paths and the plurality of network devices;
        develop a test procedure based on the topology and a plurality of constraints, wherein a first constraint in the plurality of constraints comprises sending a test data stream through each communication path in the plurality of communication paths only once in each direction; and configure the plurality of network devices to perform the test procedure;
wherein a first network device in the plurality of network devices comprises a first port, and wherein the first port is associated with a send counter and a receive counter.

19. The system of claim 18, wherein the plurality of network devices are configured using an Internet Protocol.

20. The system of claim 18, wherein a first network device in the plurality of network devices comprises a hardware circuit that is configured to support an access control list.

21. The system of claim 18, wherein the send counter is set to the size of the test data stream when the test data stream is sent from the first port.

22. The system of claim 18, wherein the receive counter is set to the size of the test data stream when the test data stream is received at the first port.

23. The system of claim 18, wherein the host computing device configures the first network device by setting the send counter and receive counter to zero.

24. A non-transitory computer readable medium storing computer executable instructions, which, when executed by a processor, cause the processor to carry out a method for testing network device connectivity in a network by a host computing device, wherein the instructions comprise:
instructions to identify a topology of the network, wherein the network comprises a plurality of communication paths connecting a plurality of network devices;
instructions to develop a test procedure based on the topology and a plurality of constraints, wherein a first constraint in the plurality of constraints comprises sending a test data stream through each communication path in the plurality of communications paths only once in each direction;
instructions to configure the plurality of network devices to perform the test procedure;
instructions to initiate the test procedure, wherein initiating comprises sending the test data stream from the host computing device to a first network device in the plurality of network devices, wherein the first network device in the plurality of network devices comprises a first port associated with a send counter and a receive counter; and
instructions to monitor the progress of the test procedure.

25. The non-transitory computer readable medium of claim 24, wherein the instructions to monitor the progress of the test procedure comprise instructions to monitor the value of the send counter and the receive counter.

26. The non-transitory computer readable medium of claim 24, wherein the instructions to configure the plurality of network devices comprises instructions to set the send counter and the receive counter to zero.

27. The non-transitory computer readable medium of claim 24, wherein a second constraint in the plurality of constraints comprises dropping the test data stream by a first network device in the plurality of network devices when the first network device has previously sent the test data stream over each communication path connected to the first network device.

28. The system of claim 18, wherein a second constraint in the plurality of constraints comprises dropping the test data stream by a first network device in the plurality of network devices when the first network device has previously sent the test data stream over each communication path connected to the first network device.

29. The system of claim 18, wherein the host computing device is further configured to initiate the test procedure by sending the test data stream to the first network device in the plurality of network devices.

* * * * *